US009762160B2

United States Patent
Tesch

(10) Patent No.: US 9,762,160 B2
(45) Date of Patent: Sep. 12, 2017

(54) METHOD OF CONTROLLING MULTIPLE PARALLEL-CONNECTED GENERATORS

(71) Applicant: Generac Power Systems, Inc., Waukesha, WI (US)

(72) Inventor: Tod R. Tesch, Oconomowoc, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 818 days.

(21) Appl. No.: 14/138,414

(22) Filed: Dec. 23, 2013

(65) Prior Publication Data

US 2015/0180393 A1 Jun. 25, 2015

(51) Int. Cl.
| | |
|---|---|
| *H02P 9/00* | (2006.01) |
| *H02P 9/04* | (2006.01) |
| *H02J 3/40* | (2006.01) |
| *H02J 3/28* | (2006.01) |

(52) U.S. Cl.
CPC ............... *H02P 9/007* (2013.01); *H02J 3/28* (2013.01); *H02J 3/40* (2013.01); *H02P 9/04* (2013.01); *Y10T 307/735* (2015.04)

(58) Field of Classification Search
CPC ..... H02P 9/007; H02P 9/04; H02J 3/28; H02J 3/40; Y10T 307/735
See application file for complete search history.

(56) References Cited

U.S. PATENT DOCUMENTS

| | | | |
|---|---|---|---|
| 3,483,463 A | * | 12/1969 | Smith .................. H02P 9/42 318/768 |
| 5,596,492 A | | 1/1997 | Divan et al. |
| 5,663,632 A | | 9/1997 | Roseman et al. |
| 6,281,664 B1 | | 8/2001 | Nakamura et al. |
| 6,693,809 B2 | | 2/2004 | Engler |
| 7,405,542 B1 | | 7/2008 | McAvoy |

(Continued)

FOREIGN PATENT DOCUMENTS

| | | |
|---|---|---|
| JP | 2004-080931 | 3/2004 |
| KR | 10-1999-0061970 | 7/1999 |

OTHER PUBLICATIONS

PCT/US2014/071382, International Search Report and Written Opinion, dated Mar. 27, 2015, 9 pages.

(Continued)

*Primary Examiner* — Jared Fureman
*Assistant Examiner* — Emmanuel R Dominique
(74) *Attorney, Agent, or Firm* — Boyle Fredrickson, S.C.

(57) ABSTRACT

A generator system configured to be connected in parallel with other generators is disclosed. The generator system includes an alternator having a stator with an output winding and a quadrature winding and a rotor with a three-phase winding. The rotor of the alternator is rotatably driven by an engine having a controller to regulate the engine speed. An inverter receives power from the quadrature winding and generates an AC voltage for the rotor winding. The inverter receives an input corresponding to the voltage on the output winding of the stator and also receives an input corresponding to the phase angle of a second AC voltage produced by another power source. The inverter controls the frequency of the AC voltage for the rotor winding such that the phase angle of the voltage on the output winding of the stator is synchronized to the phase angle of the second AC voltage.

15 Claims, 3 Drawing Sheets

(56) References Cited

U.S. PATENT DOCUMENTS

| | | | | |
|---|---|---|---|---|
| 8,294,431 | B2* | 10/2012 | McLean | H02P 9/007 |
| | | | | 290/1 A |
| 9,154,067 | B2* | 10/2015 | Frampton | H02P 9/04 |
| 2008/0067982 | A1* | 3/2008 | Dooley | H02P 9/34 |
| | | | | 322/22 |
| 2010/0148588 | A1* | 6/2010 | Algrain | H02P 5/50 |
| | | | | 307/84 |
| 2012/0205986 | A1 | 8/2012 | Frampton et al. | |

OTHER PUBLICATIONS

M.C. Chandorkar, D.M. Divan, R. Adapa; Wisconsin Electric Machines and Power Electronics Consortium—Research Report (91-8); "Control of Parallel Connected Inverters in Stand-Alone AC Supply Systems"; Jul. 1991—(8 Pages.).

Mukul C. Chandorkar, Deepakraj M. Divan, and Rambabu Adapa— "Control of Parallel Connected Inverters in Standalone ac Supply Systems"; IEEE Transactions on Industry Applications, vol. 29, No. 1, Jan. / Feb. 1993—(8 Pages).

A. Tuladhar, H. Jin, T. Unger, K. Mauch; "Parallel Operation of Single Phase Inverter Modules With No Control Interconnections"; 1997 IEEE—(7 Pages).

A. Engler; "Control of Parallel Operating Battery Inverters"; 1st PV Hybrid Power Systems Conferences, Sep. 2000—(4 Pages).

SMA Solar Technology AG, "Sunny Island Generator—White Paper"—(27 Pages).

* cited by examiner

— 1st AC VOLTAGE   ---- 2nd AC VOLTAGE

— 1st AC VOLTAGE   ---- 2nd AC VOLTAGE

METHOD OF CONTROLLING MULTIPLE PARALLEL-CONNECTED GENERATORS

FIELD OF THE INVENTION

This invention relates generally to engine-driven, electrical generators, and in particular, to a method for controlling a variable speed, constant frequency, generator in parallel with another generator.

BACKGROUND AND SUMMARY OF THE INVENTION

Electrical generators are used in a wide variety of applications. Typically, an individual electrical generator operates in a stand-by mode wherein the electrical power provided by a utility is monitored such that if the commercial electrical power from the utility fails, the engine of the electrical generator is automatically started causing the alternator to generate electrical power. When the electrical power generated by the alternator reaches a predetermined voltage and frequency desired by the customer, a transfer switch transfers the load imposed by the customer from the commercial power lines to the electrical generator. As is known, most residential electric equipment in the United States is designed to be used in connection with electrical power having a fixed frequency, namely, sixty (60) hertz (Hz).

Typically, electrical generators utilize a single driving engine coupled to a generator or alternator through a common shaft. Upon actuation of the engine, the crankshaft rotates the common shaft so as to drive the alternator that, in turn, generates electrical power. The frequency of the output power of most prior electrical generators depends on a fixed, operating speed of the engine. Typically, the predetermined operating speed of an engine for a two-pole, stand-by electrical generator is approximately 3600 revolutions per minute to produce the rated frequency and power for which the unit is designed. However, in situations when the applied load is the less than the rated kilowatt load for which the unit is designed, the fuel-efficiency of the engine will be less than optimum. As such, it can be appreciated that it is highly desirable to vary the operating speed of the engine of an electrical generator to maximize fuel efficiency, and thus reduce $CO_2$ emissions, of the engine for a given load. Further, operation of the engine-driven, electrical generator at its predetermined operating speed can produce unwanted noise. It can be appreciated that reducing the operating speed of the engine of an electrical generator to correspond to a given load will reduce the noise associated with operation of the engine-driven, electrical generator.

If the size of the load is substantial, it may be desirable to utilize multiple generators in parallel rather than a single generator to provide power to the load. If multiple generators are utilized and one of the generators fails, the remaining generators are still able to provide a portion of the power required by the load. Further, if the load requirements were to increase, another generator may be added in parallel to supplement the existing capacity of the generators. Replacing a single generator, which already is larger in size than paralleled generators, with an even larger generator would be a significant expense.

If two alternating current (AC) power sources, such as multiple generators, are to be connected in parallel, the AC output voltages must be synchronized otherwise the instantaneous difference in voltage potential may result in current transferred between the two voltage sources. If one of the generators is a single-phase generator, the pulsating torque produced by a single-phase generator may result in some fluctuation in frequency of the power output by the generator. Variations in the load applied to the generator may also cause fluctuation in the frequency of the power output by the generator. Historically, it has been known to mechanically couple the output shafts of the generators to ensure that the generators synchronously supply voltage to the load. However, mechanical coupling adds increased expense and complexity to connecting multiple generators in parallel.

Therefore, it is a primary object and feature of the present invention to provide a method for controlling a variable speed, constant frequency, stand-by electrical generator such that it may be connected in parallel with at least one other generator.

In accordance with one embodiment of the present invention, a method of controlling an engine-driven, electrical generator system configured to be connected in parallel with a second power source is disclosed. The generator system generates a first AC voltage at a first frequency with the engine running at an operating speed, and the second power source provides a second AC voltage at a second frequency. An input signal, corresponding to a measured or estimated value of a phase angle of the second AC voltage, is received at the generator system, and a frequency of the second AC voltage is determined as a function of the input signal. The operating speed of the engine is varied in response to a load thereon. A difference between the frequency of the first AC voltage, generated responsive to the operating speed of the engine, and the frequency of the second AC voltage is calculated and provided as an adjustment frequency. The frequency of the first AC voltage is modified by the adjustment frequency independent of the engine speed.

According to another aspect of the invention, the generator system includes an alternator, which, in turn, includes a rotor having windings and a stator having an output. The output of the stator is connectable to the load. The output of the stator may be connected to an input of an inverter, and an output of the inverter may be connected to the windings of the rotor. The inverter supplies power to the rotor windings at the adjustment frequency. The stator may include a main winding and a quadrature winding and the inverter may include a DC link, where the DC link is connected to the quadrature winding.

According to another embodiment of the invention, a system for synchronizing a first AC voltage generated by a first alternator with a second AC voltage generated by a second alternator is disclosed. An output of the first alternator is connected in parallel with an output of the second alternator to provide power to an electrical load. The system includes an engine configured to rotatably drive a rotor of the first alternator at an operating speed. A controller is configured to receive an input corresponding to a magnitude of the electrical load and to regulate the operating speed of the engine as a function of the magnitude of the electrical load. An inverter is configured to generate an AC voltage at an adjustment frequency for a multi-phase winding on the rotor of the first alternator. The adjustment frequency is the difference between a frequency of the second AC voltage and a frequency of the first AC voltage generated responsive to the operating speed of the engine.

According to another aspect of the invention, an input is configured to receive a signal corresponding to a phase angle of the second AC voltage, and a phase angle of the first AC voltage is synchronized to the phase angle of the second AC voltage. The inverter may include the input configured to receive the signal corresponding to the phase angle of the second AC voltage. The inverter also includes a processor configured to generate the adjustment frequency and varies the adjustment frequency to synchronize the phase angle of the first AC voltage to the phase angle of the second AC voltage. Optionally, the controller may be configured to receive the signal corresponding to the phase angle of the second AC voltage and to generate a frequency reference signal to the inverter. The inverter may set the adjustment frequency to the frequency reference signal, and the controller varies the frequency reference signal to synchronize the phase angle of the first AC voltage to the phase angle of the second AC voltage.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

The various features and advantageous details of the subject matter disclosed herein are explained more fully with reference to the non-limiting embodiments described in detail in the following description.

Figure 1:
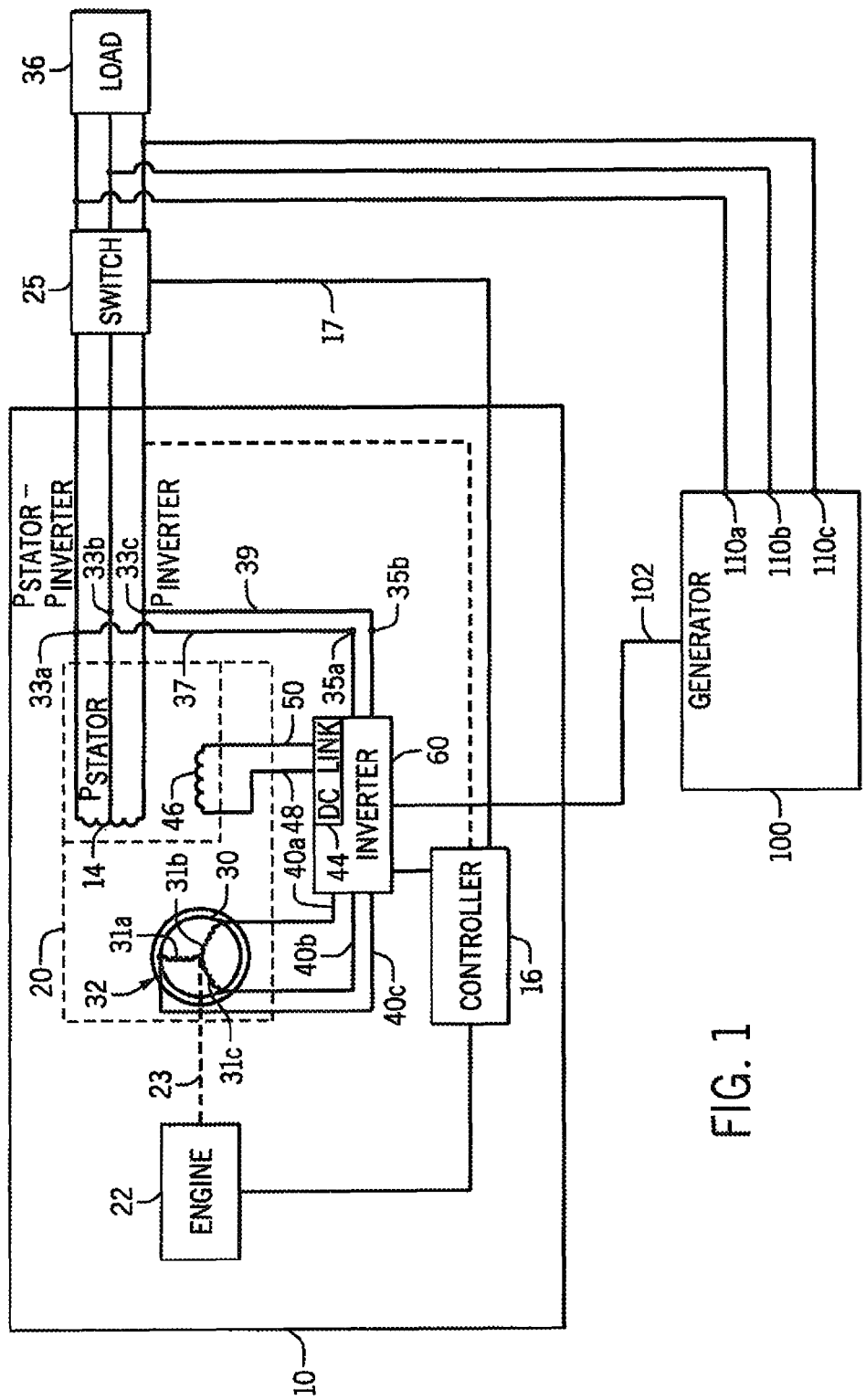
FIG. 1 is a schematic view of an engine-driven, electrical generator system for performing the method of the present invention.

Referring to FIG. 1, an engine-driven, electrical generator system for performing the methodology of the present invention is generally identified by the reference numeral 10. The generator system 10 includes an alternator 20 defined by a cylindrical rotor 30 rotatably received within a stator 32. By way of example, rotor 30 includes three-phase windings 31a-31c supplied by an inverter 60, as hereinafter described. The stator 32 includes a plurality of electrical windings (e.g. main winding 14) wound in coils over an iron core and an excitation or quadrature winding 46 shifted 90 degrees from the main winding 14. Rotation of the rotor 30 generates a moving magnetic field around the stator 32 which, in turn, induces a voltage difference between the windings of the stator 32. As a result, alternating current (AC) power is provided across outputs 33a-33c of the stator 32. The outputs 33a-33c of the stator 32 are configured to connect to a load 36 for supplying AC power thereto.

Figure 3:
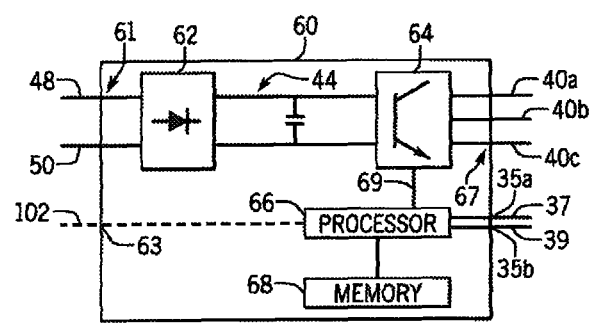
FIG. 3 is a block diagram representation of the inverter of the generator system of FIG. 1.

Referring also to FIG. 3, the inverter 60 includes a processor 66 and memory 68. The processor 66 may be a single processor or multiple processors operating in parallel. The memory 68 may be a single device or multiple devices and may include volatile memory, non-volatile memory, or a combination thereof. The processor 66 is configured to execute instructions stored in the memory 68 to control operation of the inverter 60. The inverter 60 includes a power input 61 configured to receive an input voltage 48, 50 from a power source. According to the embodiment illustrated in FIG. 1, the power source is the quadrature winding 46. The inverter 60 also includes a rectifier 62 which converts the AC voltage from the quadrature winding 46 to a DC voltage on the DC link 44. An inverter section 64 converts the DC voltage from the DC link 44 to a regulated output voltage at the power output 67. The inverter section 64 includes multiple switches, such as insulated gate bipolar transistors (IGBTs), metal-oxide semiconductor field effect transistors (MOSFETs), silicon controlled rectifiers (SCRs), or the like. The switches are controlled by a modulation routine stored in memory 68 and executed by the processor 66 to selectively connect and disconnect the DC link 44 to the power output 67. The resultant output voltage is a modulated waveform having a fundamental AC component at a desired amplitude and frequency.

The inverter 60 may also include inputs configured to receive control signals. A first input 63 is configured to receive a position signal 102. It is contemplated that the position signal 102 may be generated by a position sensor operatively coupled to a rotating machine. The position sensor may be, for example, an encoder or a resolver, and the rotating machine may be an external generator 100, as shown in FIG. 1. Optionally, the position signal 102 may be one or more voltage and/or current signals corresponding to a voltage and/or current at the output 110a-110c of the external generator 100. The processor 66 uses the position signal 102 to generate gating signals 69 for the inverter section 64 as discussed in more detail below. The gating signals 69 are used to enable and disable the switches and are controlled to generate the desired AC output voltage. The inverter 60 may also include one or more sensors connected to the output of the inverter section 64 with each sensor generating a signal to the processor 66 corresponding to a magnitude of voltage or current output from the inverter section 64. Additional inputs 35a and 35b may be configured to receive a voltage or current signal from a sensor operatively connected to one of the outputs 33a-33c of the stator 32 via lines 37 and 39. It is contemplated that the voltage and/or current feedback signal may be utilized by the processor 66 to determine the angular position of the rotor 30.

The generator system 10 further includes an engine 22. As is conventional, the engine 22 receives fuel such as diesel, natural gas, or liquid propane vapor through an intake. The fuel provided to the engine 22 is compressed and ignited within each of the cylinders responsive to a firing signal so as to generate reciprocating motion of the pistons of the engine 22. The reciprocating motion of the pistons of the engine 22 is converted to rotary motion by a crankshaft. The crankshaft is operatively coupled to the rotor 30 of the alternator 20 through a shaft 23 such that as the crankshaft is rotated by operation of the engine 22, the shaft 23 drives the rotor 30 of the alternator 20. As is known, the frequency of the AC power at outputs 33a-33c of stator 32 is dependent upon the number of poles and the rotational speed of rotor 30 which corresponds, in turn, to the speed of engine 22. The engine speed corresponding to a particular frequency of the AC power is called the synchronous speed (Ns) for that frequency. By way of example, the synchronous speed for a two pole rotor producing AC power at 60 hertz at outputs 33a-33c of stator 32 is 3600 revolutions per minute.

Figure 2:
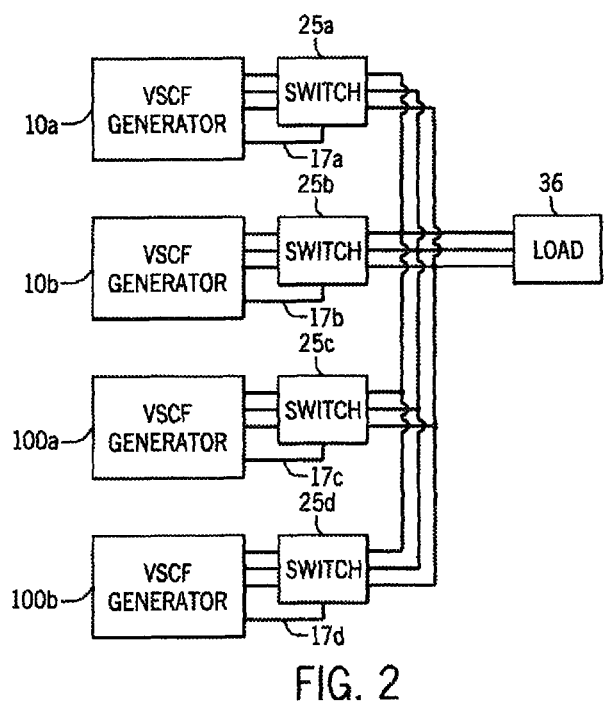
FIG. 2 is a block diagram representation of multiple generator systems connected in parallel with multiple other generators.

Referring next to FIG. 2, one generator system 10a may be connected in parallel with another generator system 10b or one or more other external generators 100a, 100b. Paralleling generators provides certain advantages. If a single generator system 10a, 10b or external generator 100a, 100b fails, the remaining generators are still able to generate a portion of the power while the failed generator is replaced. Further, if the size of the load 36 increases, additional generators may be added to increase the total power capacity from the paralleled generators. As each generator system 10a, 10b or external generator 100a, 100b is started up, there is a period of time required for the engine of the generator to accelerate up to speed and to begin driving the alternator 20 at the desired speed to generate power at the desired frequency. A switch 25a-25d is placed between each generator and the load 36 to allow the generator to remain disconnected during the initial start up period and for a control signal 17a-17d to be generated to connect the generator to the load 36 when the generator is producing power at the desired frequency. It is contemplated that separate switches 25a-25d may be utilized to selectively connect each generator to the load 36. Optionally, a single switch such as a transfer switch that alternately connects utility power and the generators to the load 36 may be utilized. According to still another embodiment, a combination of switches, including, for example, a transfer switch, as well as, one or more individual switches 25a-25d may be utilized to connect the generators to the load 36.

As discussed in more detail below, the generator systems 10a, 10b are controlled to synchronize the power output with an external signal, such as the position signal 102. A controller 16 may be used to generate the control signal 17a-17d and only connect the generator system 10a, 10b to the load when the output voltage is at the desired output frequency and synchronized to the external signal. If a transfer switch is included, a sensor monitors the status of the utility grid. The sensor may be a separate sensor or integral, for example, to the transfer switch or to a separate system controller. When the utility grid is operating normally, the transfer switch may connect the utility grid to the load 36, and when the utility grid has failed, the transfer switch may connect the generators to the load 36.

It is noted that the engine 22 of the generator system 10 does not operate at a fixed, constant speed, but rather, operates at a speed that varies in accordance with the load magnitude. In other words, at low loads, where relatively little current is required by the load 36 from the alternator 20, the engine speed is relatively low. At higher loads, where greater current is drawn from the alternator 20, the engine speed is higher. While it can be appreciated that the speed of the engine 22 can be readily adjusted to optimize the fuel consumption and reduce the noise level associated with operation of the engine 22, these changes in the engine speed, in turn, cause the frequency and voltage at the output 33a-33c of the alternator 20 to change. However, even when operating in a stand-alone application, the frequency and voltage of the AC power produced at outputs 33a-33c of stator 32 must remain relatively constant and substantially within pre-established upper and lower limits (e.g., 56-60 Hz, and 108-127 Vrms). When operating in parallel with another AC power source, the AC power produced at outputs 33a-33c of stator 32 must typically remain within an even narrower range and must also be synchronized with the other AC power source.

The generator system 10 includes the controller 16 operatively connected to a current transformer (not shown) and to the throttle actuator of engine 22. The current transformer measures a magnitude of the load 36 and supplies the same to the controller 16. It is intended for the controller 16 to calculate the optimum fuel consumption for the engine 22 for a given load 36. It can be appreciated that minimum fuel consumption typically occurs at approximately ⅔ of the synchronous speed (Ns) of the engine 22. As such, for a two pole rotor producing 60 hertz AC power at the outputs 33a-33c of the stator 32, the minimum fuel consumption occurs at an engine speed of 2400 revolutions per minute. In response to instructions received from the controller 16, the throttle actuator coupled to engine 22 increases or decreases the speed of the engine 22 to optimize the fuel consumption of the engine 22. It is also contemplated for controller 16 to receive various additional inputs indicative of the engine operating conditions and provides additional control commands (e.g., an engine shutdown command in the event oil pressure is lost) to the engine 22.

The frequency of the AC voltage at the output 33a-33c of the stator 32 is a function of both the rotor speed (Nr) and the frequency of the voltage applied to the rotor windings 31a-31c. As previously indicated, it is desirable to maintain a relatively constant frequency and voltage of the AC power produced at the outputs 33a-33c of the stator 32. Therefore, if the controller 16 varies the rotor speed (Nr) to achieve improved fuel consumption and/or noise reduction in the generator system 10, the frequency of the voltage applied to the rotor windings 31a-31c must also vary to maintain the relatively constant output frequency. Lines 40a-40c are operatively connected to rotor windings 31a-31c, respectively, of rotor 30 via, e.g. slip rings, to supply three phase currents thereto. Given the rotor speed (Nr), the traveling wave of magnetic flux produced by the three phase currents supplied by the inverter 60 relative to the rotor 30 is equal to the difference between the synchronous speed (Ns) and the rotor speed (Nr). As such, the stator 32 "sees" the magnetic flux wave travelling at the synchronous speed (Ns) independent of the rotor speed (Nr) and will produce a constant frequency at outputs 33a-33c thereof. For a rotor 30 having two poles, the required frequency for the AC power supplied by inverter 60 to rotor windings 31a-31c to produce a traveling wave of magnetic flux that causes the outputs of stator 32 to have a constant frequency may be calculated according to the equation:

$$f_{inverter} = \frac{N_s - N_r}{60} \qquad \text{Equation (1)}$$

wherein: $f_{inverter}$ is the frequency of the AC power supplied by the inverter 60 to rotor windings 31a-31c; $N_s$ is the synchronous speed; and $N_r$ is the rotor speed.

In order to deliver constant voltage and current at outputs 33a-33c of stator 32, the AC power supplied by the inverter 60 may be calculated according to the equation:

$$P_{inverter} = P_{stator} \times \frac{N_s - N_r}{N_r} \qquad \text{(Equation 2)}$$

wherein: $P_{inverter}$ is the AC power supplied by the inverter 60 or slip power; $P_{stator}$ is the AC power at the outputs 33a-33c and the quadrature winding 46 of the stator 32; $N_s$ is the synchronous speed; and $N_r$ is the rotor speed.

In view of the foregoing, it can be appreciated that by controlling the magnitude and the frequency of the AC power supplied to the rotor windings 31a-31c by the inverter 60, the frequency and voltage of the AC power produced by the generator system 10 at the outputs 33a-33c of the stator 32 is controlled.

In operation, the engine 22 is started such that the alternator 20 generates electrical power at the outputs 33a-33c of the stator 32, as heretofore described. The controller 16 monitors the magnitude of the load 36 and calculates the optimum fuel consumption for the engine 22. In response to instructions received from the controller 16, the throttle actuator coupled to the engine 22 increases or decreases the engine speed (up to a maximum of 3600 revolutions for a two pole) to optimize the fuel consumption of the engine 22. Independent of the load 36, the controller 16 maintains the speed of the engine 22 at a minimum 2400 revolutions per minute since the minimum fuel consumption of the engine 22 occurs at an engine speed of 2400 revolutions per minute.

When the rotor 30 is rotating at synchronous speed (Ns), the inverter 60 must provide a stationary wave relative to the rotor 30 in order to produce the same magnetomotive force as produced by a normal constant speed generator. In this manner, the inverter 60 behaves as an automatic voltage regulator behaves in a conventional alternator which has to provide a magnetizing magnetomotive force, as well as, a component to oppose the armature reaction. Further, it can be appreciated that by utilizing the quadrature winding 46 of the stator 32 to power the DC link 44 of the inverter 60, the main windings of the stator 32 are kept free of harmonics which occur as a natural result of DC link 44. This, in turn, eliminates the need for additional filtering or for power factor correction upstream of the DC link 44.

When the generator system 10 is operating independently of another power source, it is desirable to maintain the frequency and voltage of the AC power produced at the relatively constant frequency and voltage. In order to maintain the frequency and voltage of the AC power produced by the generator system 10 at outputs 33a-33c of stator 32 within the pre-established upper and lower limits, the controller 16 determines the frequency and magnitude of the slip power to be supplied to the rotor windings 31a-31c by the inverter 60. The frequency output by the inverter, referred to herein as an adjustment frequency, is the difference between the frequency of the voltage at the outputs 33a-33c of the stator 32 generated as a result of the operating speed of the engine 22 and the desired frequency (e.g., 60 Hz). Thus, under the control of the controller 16, the inverter 60 generates an AC voltage having the desired magnitude at the adjustment frequency to provide the necessary slip power to the rotor windings 31a-31c.

When the generator system 10 is operating in parallel with another power source, such as the illustrated generator 100, it is desirable to maintain the frequency and voltage of the AC power produced by the generator system 10 synchronized with the power produced by the other generator 100. The other generator 100 may be a standard generator and, therefore, susceptible to variations in the output frequency and/or voltage as a function of the magnitude of the load 36 applied. Therefore, it is desirable to synchronize the generator system 10 to the other generator 100 prior to connecting the two in parallel. The switch 25 may be controlled to alternately connect/disconnect the generator system 10 in parallel with the other generator system 100. Once the controller 16 has synchronized the generator system 10 with the other generator system 100, it generates a control signal 17 to connect the outputs (33a-33c and 110a-110c) in parallel.

According to the illustrated embodiment, a position signal 102 corresponding to the phase angle of the voltage output from the other generator 100 is provided to the inverter 60. The other generator 100 may include an angular position sensor, such as a resolver or an encoder, operatively connected to the rotor of the other generator 100 and generating a measured position signal 102 corresponding to the angular position of the rotor. Optionally, a voltage and/or current sensor may be connected to the outputs 110a-110c of the other generator 100 and the generator system 10 determines the angular position of the output voltage and/or current, respectively. It is further contemplated that the other generator 100 may internally measure operating parameters such as the voltage and/or current generated therein and provide an estimated position signal 102 based on the measured values. The inverter 60 may use the position signal 102 to determine the frequency of the voltage output by the other generator 100. The inverter 60 determines the difference between the frequency of the voltage at the outputs 33a-33c of the stator 32 generated as a result of the operating speed of the engine 22 and the frequency of the voltage output by the other generator 100. The difference between the frequencies is used as the adjustment frequency such that the inverter 60 generates an AC voltage having the desired magnitude at the adjustment frequency to provide the necessary slip power to the rotor windings 31a-31c. The inverter 60 monitors the position signal 102 to adjust the phase angle of the AC voltage at the outputs 33a-33c of the stator 32 such that it remains synchronized with the fluctuations from the AC voltage generated by the other generator 100. The phase angle of the AC voltage at the outputs 33a-33c of the stator 32 is adjusted by varying the adjustment frequency in the inverter 60 and, in turn, varying the frequency of the slip power provided to the rotor windings 31a-31c. It is further contemplated that the inverter 60 may be controlled to offset the angle of the AC voltage at the outputs 33a-33c of the stator 32 to control sharing of the load 36 between the other generator 100 and the generator system 10.

Figure 4:
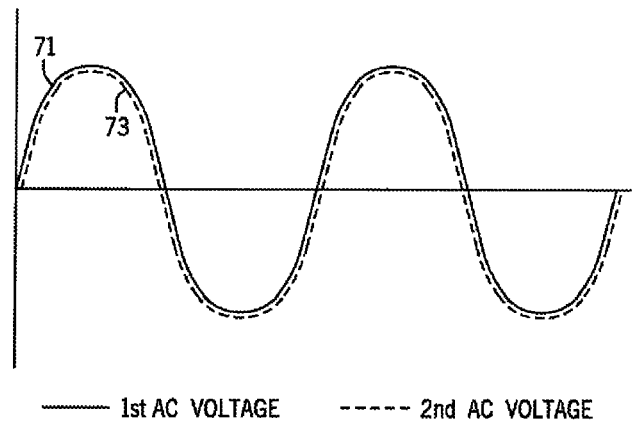
FIG. 4 is a graphical representation of an output voltage from the generator system synchronized to an output voltage from a paralleled generator.

Optionally, the position signal 102 may be provided to the controller 16, and the controller 16 may be configured to generate a frequency reference signal. The frequency reference signal corresponds to the difference between the frequency of the voltage at the outputs 33a-33c of the stator 32 generated as a result of the operating speed of the engine 22 and the frequency of the voltage output by the other generator 100 and is provide to the inverter 60. The inverter 60 sets the adjustment frequency equal to the frequency reference signal and then generates an AC voltage having the desired magnitude at the adjustment frequency to provide the necessary slip power to the rotor windings 31a-31c. With reference to FIG. 4, the first AC voltage 71 from the generator system 10 and the second AC voltage 73 from the other generator 100 are synchronized with each other and may be provided in parallel to the load 36.

Figure 5:
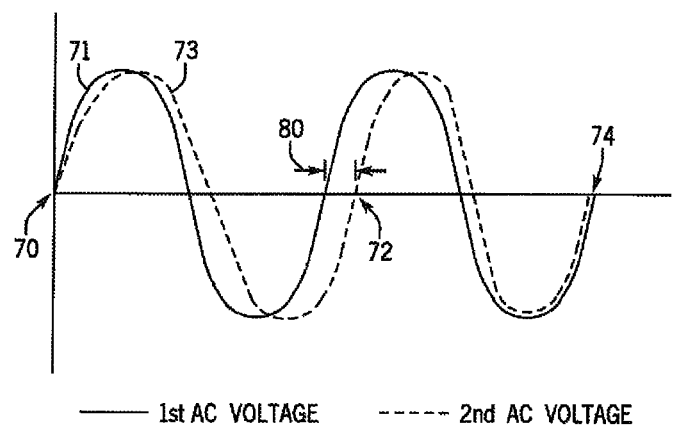
FIG. 5 is a graphical representation of the generator system compensating the phase angle of the output voltage from the generator system in response to a fluctuation in the output voltage from the paralleled generator.

As previously indicated, however, the output frequency of the second AC voltage 73 from the other generator 100 is subject to fluctuations, for example, from torque pulsations and/or load variations. The inverter 60 uses the position signal 102 to adjust the phase angle of the first AC voltage 71 such that it remains synchronized with the fluctuations from the second AC voltage 73. With reference to FIG. 5, the second AC voltage 73 from the other generator 100 is illustrated as increasing in frequency. The inverter 60 in the generator system 10 monitors the position signal 102 and regulates the adjustment frequency accordingly such that the first AC voltage 71 from the generator system 10 is compensated accordingly. At the start 70 of the graph, the two AC voltages 71, 73 are synchronized. The other generator 100 receives a disturbance causing the frequency of second the AC voltage 73 to increase. At the mid-point 72 of the graph, an error 80 in the phase angle between the two AC voltages 71, 73 exists. The inverter 60 begins compensating for the error 80 such that the phase angle of the first AC voltage 71 changes and, in turn, the frequency of the first AC voltage 71 changes to match the frequency of the second AC voltage 73. At the end 74 of the graph, the two voltages 71, 73 are again synchronized.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A method of controlling an engine-driven, electrical generator system configured to be connected in parallel with a second power source, the generator system generating a first alternating current (AC) voltage at a first frequency with the engine running at an operating speed, the second power source providing a second AC voltage at a second frequency, the method comprising the steps of:
    configuring an inverter to receive an input signal corresponding to a phase angle of the second AC voltage;
    determining the second frequency as a function of the input signal;
    varying the operating speed of the engine in response to a load thereon;
    calculating a difference between the first frequency generated responsive to the operating speed of the engine and the second frequency and providing the difference as an adjustment frequency;
    varying the adjustment frequency to synchronize a phase angle of the first AC voltage to a phase angle of the second AC voltage; and
    modifying the first frequency by the adjustment frequency independent of the engine speed.

2. The method of claim 1 wherein the generator system includes an alternator including a rotor having a winding and a stator having an output, the output of the stator being connectable to the load.

3. The method of claim 2 comprising the additional steps of:
    operatively connecting the output of the stator to an input of an inverter, the inverter receiving the first AC voltage at the input; and
    operatively connecting an output of the inverter to the winding of the rotor, the inverter supplying power to the rotor winding at the adjustment frequency.

4. The method of claim 3 wherein the stator has a main winding and a quadrature winding and wherein the inverter includes a DC link, the DC link being operatively connected to the quadrature winding.

5. The method of claim 1 wherein the generator system is configured to execute in a first operating mode and in a second operating mode and wherein during the first operating mode, the generator system determines the adjustment frequency as a difference between a desired frequency and the first frequency generated responsive to the operating speed of the engine and during the second operating mode, the generator system determines the adjustment frequency as the difference between the first frequency generated, responsive to the operating speed of the engine and the second frequency.

6. The method of claim 1 wherein the second power source is a single-phase generator, the method further comprising the initial step of connecting an angular position sensor to a shaft of the single-phase generator, wherein the angular position sensor generates the input signal to the generator system.

7. The method of claim 1 wherein the second power source is a single-phase generator, further comprising the steps of:
    measuring one of the second AC voltage and a current generated by the single-phase generator; and
    providing the measured voltage or current as an input to the inverter, wherein the measured voltage or current is the input signal corresponding to the angular position of the rotor.

8. A system, for synchronizing a first alternating current (AC) voltage generated by a first alternator with a second AC voltage generated by a second alternator, wherein an output of the first alternator is connected in parallel with an output of the second alternator to provide power to an electrical load, the system comprising:
    an engine configured to rotatably drive a rotor of the first alternator at an operating speed;
    a controller configured to receive an input corresponding to a magnitude of the electrical load and to regulate the operating speed of the engine as a function of the magnitude of the electrical load; and
    an inverter configured to generate an AC voltage at an adjustment frequency for a multi-phase winding on the rotor of the first alternator, wherein the adjustment frequency is equal to a difference between a frequency of the second AC voltage and a frequency of the first AC voltage generated responsive to the operating speed of the engine, the inverter including:
        an input configured to receive a signal corresponding to a phase angle of the second AC voltage; and
        a processor configured to generate the adjustment frequency and to vary the adjustment frequency to synchronize a phase angle of the first AC voltage to the phase angle of the second AC voltage.

9. The system of claim 8 wherein:
    the controller is configured to receive the signal corresponding to the phase angle of the second AC voltage and to generate a frequency reference signal to the inverter,
    the inverter sets the adjustment frequency to the frequency reference signal, and
    the controller varies the frequency reference signal to synchronize the phase angle of the first AC voltage to the phase angle of the second AC voltage.

10. The system of claim 8 further comprising an angular position sensor operatively coupled to a rotor of the second alternator, wherein the angular position sensor is configured to generate a position signal and wherein the position signal is the signal corresponding to the phase angle of the second AC voltage.

11. The system of claim 8 further comprising at least one sensor configured to generate a voltage signal corresponding to an amplitude of the second AC voltage, wherein the voltage signal is the signal corresponding to the phase angle of the second AC voltage.

12. A method of controlling an engine-driven, electrical alternator including a rotor having a winding and a stator having an output, the alternator generating a first alternating current (AC) output voltage at a frequency at the stator output with the engine running at an engine speed, wherein the electrical alternator is configured to be connected in parallel with a second power source generating a second AC voltage at a second frequency, the method comprising the steps of:

adjusting the engine speed in response to a load thereon; and supplying slip power to the rotor winding to adjust the frequency of the first AC output voltage without further adjustment of the engine speed, wherein the step of supplying the slip power to the rotor windings includes the additional steps of:

calculating a difference between the frequency of the first AC output voltage generated responsive to the engine speed and the second frequency and providing the difference as an adjustment frequency; and generating the slip power having a frequency generally equal to the adjustment frequency; and configuring an inverter to receive an inputs signal corresponding to a phase angle of the second AC voltage, the inverter including a processor configured to generate the adjustment frequency and to vary the adjustment frequency to synchronize a phase angle of the first AC voltage to the phase angle of the second AC voltage.

13. The method of claim 12 comprising the additional steps of:

operatively connecting the output of the stator to an input of an inverter, the inverter receiving the first AC voltage at the input; and operatively connecting an output of the inverter to the rotor winding, the inverter supplying power to the rotor winding at the adjustment frequency.

14. The method of claim 13 wherein the stator has a main winding and a quadrature winding and wherein the inverter includes a DC link, the DC link being operatively connected to the quadrature winding.

15. A method of controlling an engine-driven, electrical alternator including a rotor having a winding and a stator having an output, the alternator generating a first alternating current (AC) output voltage at a frequency at the stator output with the engine running at an engine speed, wherein the electrical alternator is configured to be connected in parallel with a second power source generating a second AC voltage at a second frequency, the method comprising the steps of:

adjusting the engine the speed in response to a load thereon; and supplying slip power to the rotor winding to adjust the frequency of the first AC output voltage without further adjustment of the engine speed, wherein the step of supplying the slip power to the rotor windings includes the additional steps of:

calculating a difference between the frequency of the first AC output voltage generated responsive to the engine speed and the second frequency and providing the difference as an adjustment frequency; and generating the slip power having a frequency generally equal to the adjustment frequency;

configuring an inverter to generate the adjustment frequency; and configuring a controller to receive an input signal corresponding to a phase angle of the second AC voltage and to generate a frequency reference signal to the inverter;

wherein the inverter sets the adjustment frequency to the frequency reference signal, and the controller varies the frequency reference signal to synchronize a phase angle of the first AC voltage to the phase angle of the second AC voltage.

\* \* \* \* \*